Nov. 7, 1967  R. GARRAHAN  3,351,089
CONTROL VALVE FOR DIVING APPARATUS
Filed June 30, 1964
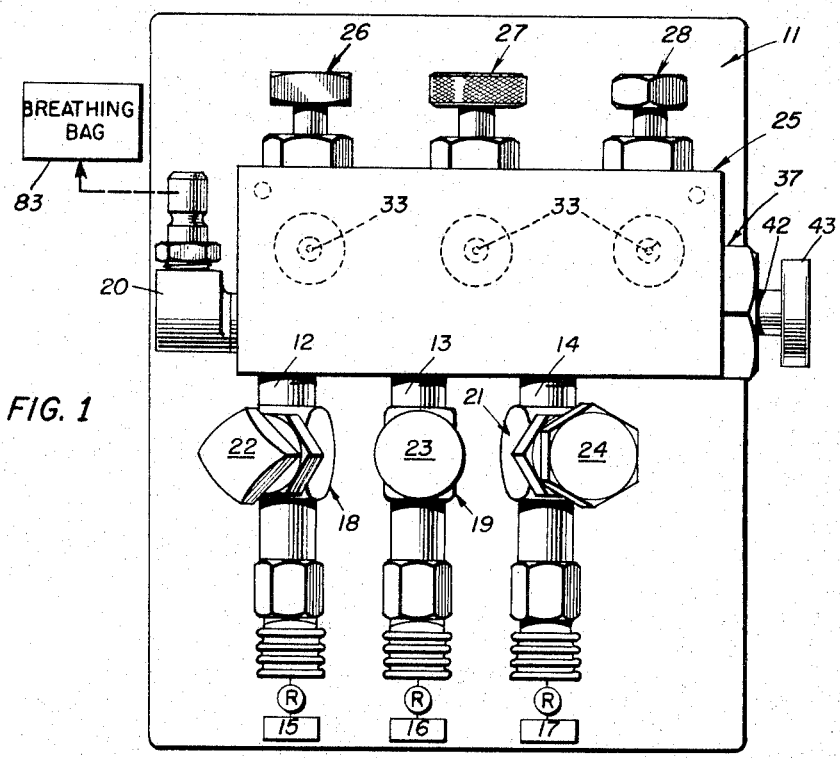
FIG. 1
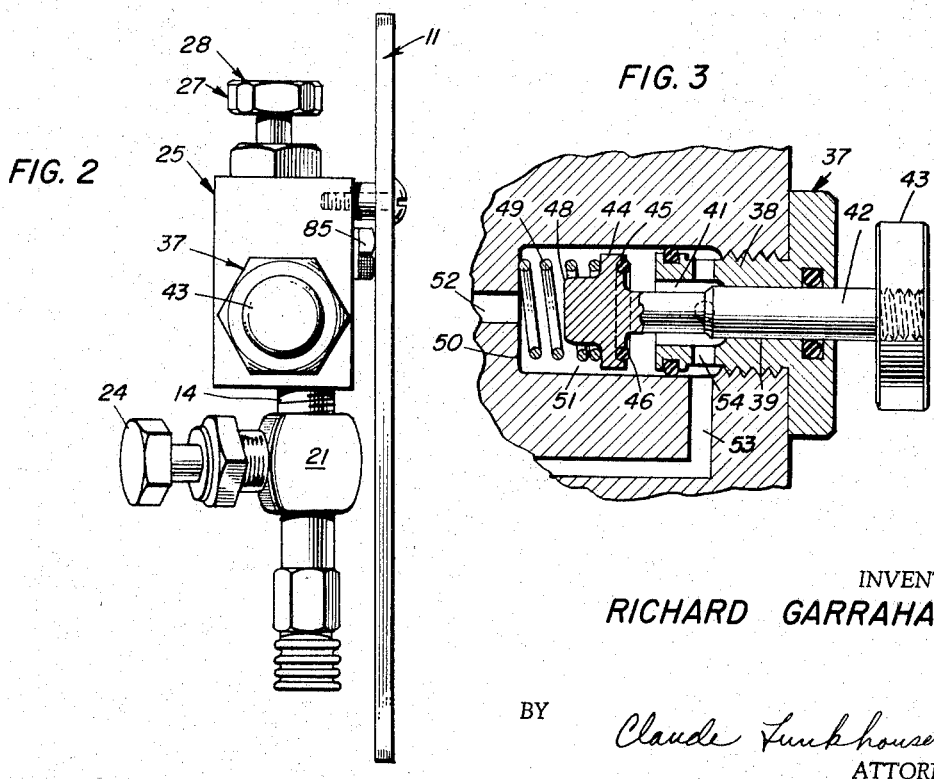
FIG. 2
FIG. 3
INVENTOR
RICHARD GARRAHAN
BY Claude Funkhouser
ATTORNEY Nov. 7, 1967   R. GARRAHAN   3,351,089
CONTROL VALVE FOR DIVING APPARATUS
Filed June 30, 1964   3 Sheets-Sheet 2
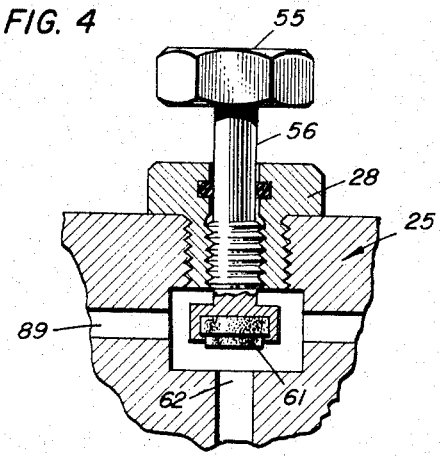
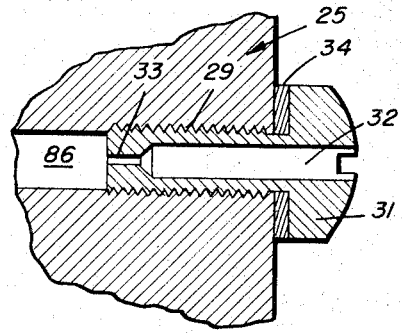
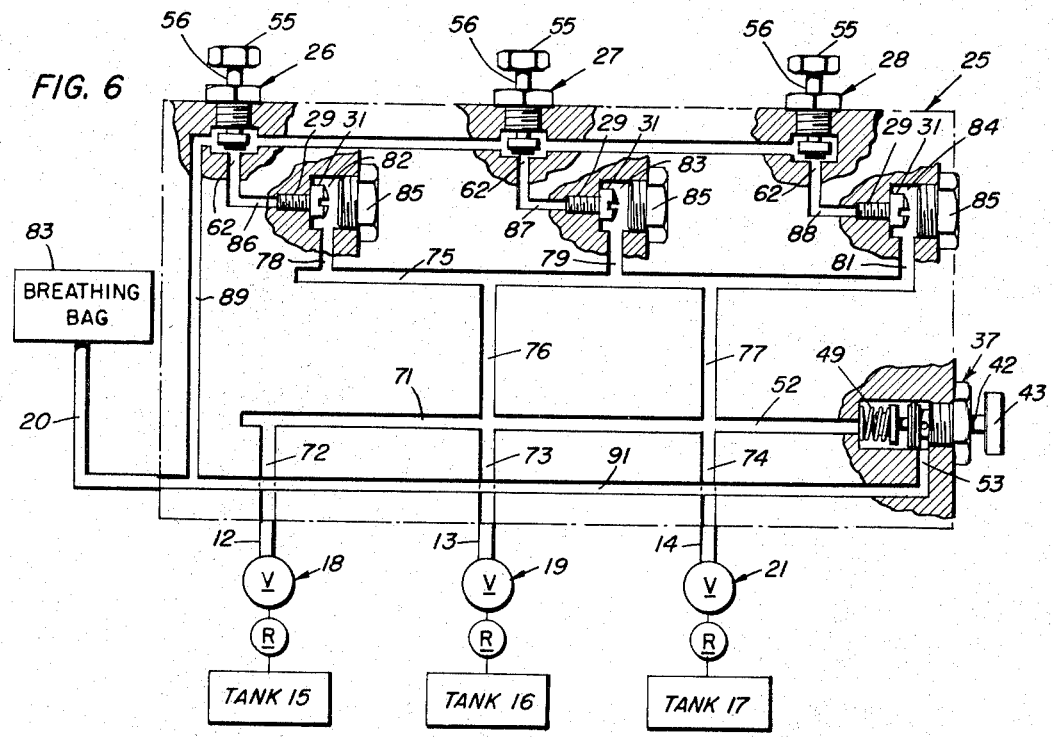

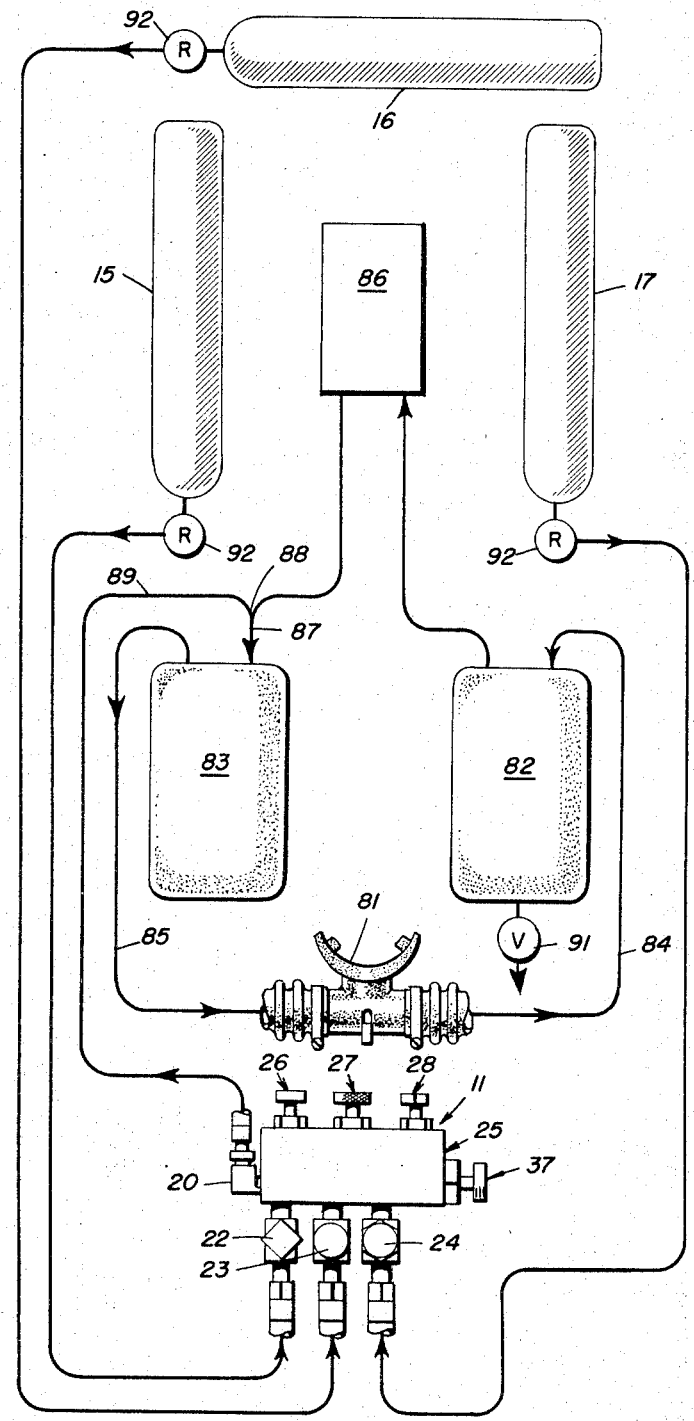

United States Patent Office 3,351,089
Patented Nov. 7, 1967

3,351,089
CONTROL VALVE FOR DIVING APPARATUS
Richard Garrahan, 1 Lookout Green SW.,
Washington, D.C. 20032
Filed June 30, 1964, Ser. No. 379,421
1 Claim. (Cl. 137—599)

The invention described herein may be manufactured and used by or for the Government of the United States of America for governmental purposes without the payment of any royalties thereon or therefor.

This invention relates to a manual control valve for use in scuba diving, to control the quality and quantity of breathable gas.

It is customary in deep sea diving to prepare the mixture of gases previous to diving for the depth at which the work is to be done, so that a diver descends with the gas in a tank prepared for breathing at the depth at which he will work. This proportional mixture of gases varies with the depth and will vary from approximately one-fourth oxygen to three-fourths nitrogen when working near the surface to one-tenth oxygen and nine-tenths helium when working below three hundred feet. The descent to the deepest point of the dive is done rapidly, that is it will take approximately three minutes to reach a depth of three hundred feet. The working time will depend somewhat on the conditions under which the diver works, that is whether the work is strenuous or light and whether he has to overcome currents or obstructions. This time at three hundred feet could be one-half an hour. The ascent time is controlled by tables which are based on the time spent on the bottom and would be in the cited instance about two hours.

During the working period, at the three hundred foot level the diver would require a definite percentage of oxygen to helium and this mixture is prepared for him at the surface and stored in a tank which he carries on his shoulders. However the quality of the gas is only one factor. Due almost entirely to the work which the diver is doing, he requires more or less quantity of gas. Should he forsee two minutes of strenuous work, he knows that during that time he will require a greater quantity of breathable gas. If there should be a period during which he is quiet and resting, he will require less gas. It is therefore necessary that some control be exercised over the quantity of gas available to the diver. Heretofore this has been accomplished by automatic valves which are not subject to control by the diver.

The use of automatic valves to control the quantity of gas available to a diver depends on the depth of his inhalation and the pressure at which he is working. The control is subject to the imperfections of the valves and the automatic mechanisms which actuate the valves. The usual tolerances held in the manufacture are so sufficiently large that under changes of temperature and pressure of deep dives these automatic valves are not dependable to deliver the exact amount of gas when required.

The use of automatic valves relieves the diver of the necessity of operating the valve but it also takes from the diver the assurance that he will get the amount of gas required. This dependence on automatic valves which may stick or simply not function properly creates an anxiety which is completely absent when a manually operated valve is used.

The object of the present invention is to provide a manually operated valve which will under the manipulation of the diver control both the quality and quantity of gases which he will breathe.

It is a further object of the invention to provide a manually operated control valve which will provide a plurality of inlet connections adapted to be connected to sources of different mixtures of gases, which mixtures are prepared for the diver, the proportions being dependent on the depth at which he will be working.

It is a further object of the present invention to provide an outlet for the gases controlled by the valve and to connect this outlet with the mouthpiece of a diver.

It is a still further object of the present invention to provide means for measuring the quantity of the gases to be delivered from the source of gas to the outlet.

It is a still further object of the present invention to provide a plurality of orifices which are connected to all of the inlets so that no matter which inlet is selected, there will be a selection of orifices through which the gases will pass.

It is still another object of the present invention to provide orifices which are disposed in interchangeable elements so that a variety of orifices may be used to control the quantity of gases passing through the control valve.

It is still a further object of the present invention to provide a bypass valve by means of which the effects of the orifices may be eliminated and the gases directed to the outlet from the inlet without passing through the orifices, so that the diver under instances of emergency may by opening a single valve, by-pass the orifices and get gases direct from the inlet.

It is a still further object of the present invention to provide a manually operated control valve by means of which the driver can instantly control the quality (mixture of gases) and the quantity of gas which will be available for breathing, and under emergency conditions will be enabled to bypass the quantity control and breathe directly from the containers of gas mixture.

The other objects and many of the attendant advantages of this invention will be readily appreciated as the same becomes better understood by reference to the following detailed description when considered in connection with the accompanying drawings wherein:

FIG. 1 is a front elevation of the control valve.

FIG. 2 is a side elevation of the control valve.

FIG. 3 is a detail view of the push bypass valve, shown partly in section.

FIG. 4 is a detail of one of the orifice shut-off valves shown partly in section.

FIG. 5 is a sectional view of one of the orifices.

FIG. 6 is a diagrammatic view of the entire control valve with the passages and parts slightly rearranged to illustrate the operation of the valve.

FIG. 7 is a diagrammatic view of the complete working system.

Referring to the drawings wherein like parts are designed by like numerals, and those parts shown in the diagrammatic view have the same numbers as their structural counterpart, although the size, shape and location are slightly different, the control valve generally is indicated by numeral 11.

As shown in FIG. 1, the bottom of the valve is formed with three inlets 12, 13 and 14 respectively in which are attached containers 15, 16 and 17 respectively, the containers being filled with mixtures of helium and oxygen in different proportions. Between the inlets and the containers, valves 18, 19 and 21 respectively control the admission of gases from the containers 15, 16 and 17 to the interior of the valve. These valves are of well known type and form no part of this invention other than to provide shut-off for two of the containers while permitting the gas in one of the containers to enter the control valve. The controlling knobs or handles of the valves are shaped differently to provide means for detecting the proper valve in the dark or by the sense of touch, valve 18 having a square shaped handle 22, valve 19 having a circular handle 23 while valve 21 has a hexagon shaped handle 24.

On the top of the control valve housing 25, an additional three valves 26, 27 and 28 are mounted. These valves are each connected to a chamber containing an orifice such as shown in FIG. 5. The orifice elements mounted in the different chambers are similar except for the size of the opening. Each orifice (FIG. 5) consists of a screw 29 having a kerfed head 31 and a longitudinal bore to form a passageway 32. The bottom of the passageway is drilled to an exact size as shown at 33 to control the flow of gas. A washer 34 seated against the inside of the head forms a seal when the orifice element is in working position. These orifice elements are easily removed and others having a different size drilled hole may be inserted to provide a complete control of the quantity of gas passing through the control valve. The valves 26, 27 and 28 each control the passage of gas through one of the orifices which are connected to an inlet passage communicating with any of the selected containers so that a container is selected for quality of gas, which is a mixture of the proper proportion of helium and oxygen for the depth at which the diver is working, the diver will have manual control over the quantity of that gas he receives, by having three selections of orifices for the gas to pass through.

At the left side of the control valve as shown in FIG. 1, an outlet 20 is connected to the discharge from all of the valves 26, 27 and 28. This outlet is connected to the diver's breathing bag 83.

Mounted on the right side of the control valve is a quick acting push valve which is connected to both the inlet passage and the outlet passage so that should an emergency arise the diver can, by pushing the emergency valve, receive gas direct from the inlet, bypassing the orifice. The push valve 37, shown in FIG. 3 is formed with a threaded body portion 38, and is longitudinally bored at 39, which bore is enlarged at 41. A rod 42 reciprocates in the bore 39 and carries a knob 43 at one end and a disc 44 at the other end. The disc 44 has a circular recess 45 housing an O-ring 46 to provide a seal against the inner face 47 of the threaded body portion 38. The disc is further formed with a reduced portion 48 on which a coil spring 49 is seated. The spring abuts against the inner wall 50 of the opening 51 into which the threaded body portion 38 is screwed. A passageway 52 which connects with the inlet passageway and a second passageway 53 which connects with the outlet leads from the recess 51. Passage of the gas from the passageway 52 around the disc and through the enlarged portion of the longitudinal bore into a cross-passage 54, in the threaded body portion, into the passageway 53 is easily accomplished when the valve is depressed. Normally when under the influence of the spring the O-ring 46 will engage the bottom of the body portion to provide a seal preventing any flow of gas.

FIG. 4 shows one of the valves 26, 27 or 28. This valve 28 is provided with a hexagon head 55, while the other two valves have round and square heads respectively to provide means for selecting the proper valve by touch. The head 55 is secured to a stem 56 which is threaded to move the seat 61 into sealing engagement with the opening 62 in a passageway leading from the orifice and to the outlet.

Referring to the diagrammatic view shown in FIG. 6, wherein the parts of the valve are not exactly according to size and shape or exact location, the parts are numbered to correspond to similar parts in the structural drawings. The passageways which are structurally on different planes are shown in FIG. 6 in the same plane in order to more easily describe the flow of the gas through the control valve.

The diagrammatic view shows the inlets 12, 13 and 14 connected to an inlet passage 71 by short passages 72, 73 and 74 respectively. The passageway 71 is connected to a middle passage 75 by short passages 76 and 77. The middle passage is connected, by short passages 78, 79 and 81 to chambers 82, 83 and 84 respectively. Each of the chambers are closed by a screw 85 which when removed permits the insertion of the orifice elements 29. These orifice elements are threaded into the bottom of the recesses to restrict the flow of gas into passages 86, 87 and 88 leading to the opening 62. The opening 62 is controlled by the separate valves 26, 27 and 28 and when any of these valves are open, the gas will flow through the opening 62, around any of the valves, 26, 27 or 28, into the opening and passage 89 from which it will pass into the outlet.

Connected to the inlet passageway 71 at the opening 52, the push button valve 37 bypasses the middle passageway 75, leading the gas directly into the passageway 91 and to the outlet 20.

Referring to FIG. 7, where the entire closed system is diagrammatically illustrated, the valve 11 is shown connected to the sources of different gas mixtures 15, 16 and 17 and to a mouthpiece which is part of the scuba diving system.

The mouthpiece 81 is of the conventional type having inhale and exhale valves (not shown). The exhale valve channels the exhaled gas to an exhalation bag 82 and the inhale valve functions to admit fresh gas from an inhalation bag 83 by tubes 84 and 85 respectively.

The exhaled gas passes through tube 84 into the exhalation bag 82 and from the exhalation bag into a cannister 86 containing a carbon dioxide absorbent. The purified gas passes from the cannister 86 thru tube 87 into the inhalation bag 83. Joining the tube 87 at a point 88 between the cannister 86 and the inhalation bag 83 is a tube 89. The tube 89 is connected to the outlet 20 of the valve. The pressurized gas from the outlet 20 enters the tube 87 at point 88 in a manner to produce a venturi effect and so help the transfer of the gas from the cannister to the inhalation bag. Beyond the point 88 the tube 87 is connected to the breathing bag which in turn is connected to the inhalation valve of the mouthpiece 81.

An exhaust valve 91 is mounted in the exhalation bag to provide exhaust means for regulating pressure in the system. Also regulator valves 92 are attached to the outlets of each of the gas mixture carrying tanks 15, 16 and 17.

The control valve above described controls, first, the selection of the container of gas mixture, the gas which is to be used at the depth the diver is working. Secondly, by selecting the correct valve and its orifice it controls the liter flow or the quantity of gas delivered to the diver. And thirdly, through the push button valve the orifice may be bypassed to give the diver direct connection with the container. The use of a manually controlled valve eliminates the dependence on automatic mechanism which has been found, too many times, to be unreliable.

Obviously many modifications and variations of the present invention are possible in light of the above teachings. It is therefore to be understood that within the scope of the appended claim the invention may be practiced otherwise than as specifically described.

What is claimed is:

A manually operated control valve for scuba diving apparatus comprising:

a rectangular box shaped valve body formed to include a plurality of transverse inlet passages along one side thereof, each adapted to be connected to a valve controlled specific gas container, a first longitudinal passageway connected to each of the transverse inlet passageways and terminating in a single recess extending through one end of the valve body, an inner second longitudinal passageway connected to the first longitudinal passageway through transverse passageways, said inner second longitudinal passageway being also connected to a plurality of recesses and arranged in pairs of one chamber connected to one recess, an outer third longitudinal passageway connecting the plurality of recesses, an outer transverse passageway connecting the outer third longitudinal passageway with an emergency fourth longitudinal passageway, said emergency fourth longitudinal passageway being connected to the single recess and an outlet port;

an orifice element mounted in each of the chambers for limiting the flow of gas through each chamber;

a manually operated valve in series flow with each orifice element mounted in each of the recesses connected to the third longitudinal passageway for controlling the flow of gas into that passageway from its associated orifice element to the outlet port; and an emergency valve mounted in the single recess for controlling an emergency flow of gas direct from the inlet first longitudinal passageway to the emergency fourth longitudinal passageway into the outlet port, by-passing the limiting orifice elements and the manually operated valves.

References Cited

UNITED STATES PATENTS

| 2,229,903 | 1/1941 | Schmohl | 137—599 |
| 2,817,350 | 12/1957 | Bradner | 137—64 X |
| 3,062,410 | 11/1962 | Schwieger | 137—599 X |
| 3,068,864 | 12/1962 | Tietze | 137—63 X |
| 3,111,946 | 11/1963 | Galeazzi | 137—64 X |

WILLIAM F. O'DEA, *Primary Examiner.*

H. W. WEAKLEY, *Assistant Examiner.*